United States Patent Office 3,031,455
Patented Apr. 24, 1962

---

3,031,455
1-PHENETHYL-4-PIPERIDYL CARBAMATES
Roman P. Holysz, Kalamazoo, Mich., assignor to The Upjohn Company, Kalamazoo, Mich., a corporation of Delaware
No Drawing. Filed July 20, 1959, Ser. No. 828,017
8 Claims. (Cl. 260—294.3)

This invention pertains to novel organic compounds, and is particularly directed to novel carbamate esters of 1-phenethyl-4-piperidinols in the form of their free bases, N-oxides, and acid addition salts of said free bases and N-oxides.

The compounds of the invention, in the form of their free bases, are represented by the following general structural formula:

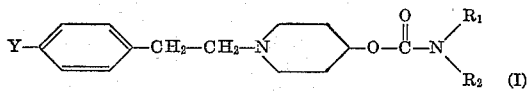

wherein Y is selected from the group consisting of hydrogen, halogen having an atomic weight between 35 and 127, i.e., chlorine, bromine, and iodine, lower-alkyl, for example, methyl, ethyl, isopropyl, butyl, sec-butyl, amyl, isoamyl, hexyl, and like lower-alkyl radicals, and lower-alkoxy, for example, methoxy, ethoxy, isopropoxy, butoxy, sec-butoxy, amyloxy, isoamyloxy, hexyloxy, and like lower-alkoxy radicals; and wherein $R_1$ and $R_2$ are selected from the group consisting of hydrogen and lower-alkyl radicals, for example, methyl, ethyl, isopropyl, butyl, sec-butyl, amyl, isoamyl, hexyl, and like lower-alkyl radicals.

The novel compounds of the invention possess valuable pharmacological activity. Illustratively, the compounds of the invention are antisecretory agents which have a very low order of anticholinergic activity. Thus they are useful for inhibiting gastric secretion without causing substantial anticholinergic side-effects such as dryness of the mouth, blurring of vision, constipation, tachycardia, etc. Further, the compounds of the invention are useful, in accordance with U.S. Patents 1,915,334 and 2,075,359, in forming amine fluosilicate mothproofing agents and, in accordance with U. S. Patents 2,425,320 and 2,606,155, in forming amine thiocyanateformaldehyde condensation products for use as pickling inhibitors.

The carbamate esters of the invention are readily obtained by esterifying a 1-phenethyl-4-piperidinol having the following general structural formula:

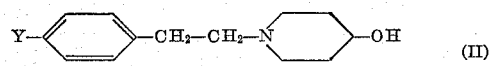

wherein Y is as defined above, with a phenyl haloformate, for example, phenyl chloroformate, to produce a 1-phenethyl-4-piperidyl phenyl carbonate having the following general structural formula:

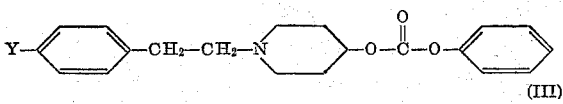

wherein Y is as defined above, and then reacting the latter with ammonia or a primary or secondary amine (i.e., mono-lower-alkylamine or di-lower-alkylamine) to produce the corresponding 1 - phenethyl - 4 - piperidyl carbamate. The foregoing type reaction is particularly satisfactory for preparing the carbamate esters of the invention wherein $R_1$ and $R_2$ are hydrogen or one of them is lower-alkyl. Thus simple ammonolysis of a 1-phenethyl-4-piperidyl phenyl carbonate gives carbamate esters (Formula I above) wherein $R_1$ and $R_2$ are hydrogen, whereas aminolysis with a primary amine, i.e., a mono-lower-alkylamine, for example, methylamine, ethylamine, isopropylamine, hexylamine, and like amines gives carbamate esters in which one of $R_1$ and $R_2$ is lower-alkyl.

Phenyl carbonate esters can also be used in the preparation of dialkylcarbamates of the invention (compounds having Formula I above in which both $R_1$ and $R_2$ are lower-alkyl) by reaction (aminolysis) with a di-lower-alkylamine, illustratively, dimethylamine, diisopropylamine, methylbutylamine, and the like. However, side reactions may occur, with attendant low yields of desired product, and it is preferred to prepare the dialkylcarbamates by a different process described below.

Phenyl carbonate esters of 1-phenethyl-4-piperidinols (Formula III above) are prepared by reacting a phenyl haloformate, for example, phenyl chloroformate, with a 1-phenethyl-4-piperidinol (Formula II above). Advantageously, this reaction is carried out at low temperatures, i.e., temperatures in the range of about —20° to 10° C. and, preferably, at temperatures of about zero to about 5° C. The piperidinol compound and phenyl haloformate are reacted in the presence of an inert solvent, illustratively ether, tetrahydrofuran, dioxane, toluene, xylene, benzene, and the like, and an acid acceptor, illustratively pyridine, lutidine, picoline, quinoline, isoquinoline, and the like. If desired, the acid acceptor can also serve as the inert solvent merely by employing a sufficient quantity of the same, without adding an additional inert solvent of the kind illustrated. The 1-phenethyl-4-piperidyl phenyl carbonate intermediate thus formed can be isolated and purified, if so desired. Ordinarily this is not necessary, however, because the solution containing the intermediate can be used directly in the subsequent ammonolysis or aminolysis.

The phenyl carbonate ester of a 1-phenethyl-4-piperidinol prepared as above is then reacted with ammonia or with a mono-lower-alkylamine, illustratively methylamine, ethylamine, isopropylamine, hexylamine, and like amines to produce the carbamate or alkylcarbamate corresponding to the particular nitrogenous base employed in the reaction. The reaction of the phenyl carbonate ester with ammonia or alkylamine is carried out in the liquid phase, preferably in the presence of an inert solvent which as noted above can be the solvent in which the phenyl carbonate ester was prepared. Advantageously, the reaction can be carried out at very low temperatures, illustratively in the range of about —80° to —20° C., particularly when the reaction mixture boils at low temperatures, e.g., when using ammonia. Alternatively, solutions of ammonia or alkylamines in inert solvents such as methanol, ethanol, and the like can be used at temperatures in the range of about —20° to about 0° C. Even higher temperatures, such as up to about 35° C. can be used, particularly when the reaction mixture is held under pressure in a bomb. Thus the reaction can be carried out at atmospheric or super-atmospheric pressure, and at temperatures ranging from about —80° to about 35° C.

After the substitution of the amino group ($NH_2$) or alkylamino group for the phenoxy group of the phenyl carbonate, i.e., ammonolysis or aminolysis, is completed, the carbamate ester is recovered from the reaction mixture, and purified if so desired.

Alternatively, monoalkylcarbamate esters of this invention (compounds of Formula I above in which one of $R_1$ and $R_2$ is lower-alkyl) can be prepared by reacting a 1-phenethyl-4-piperidinol having Formula II above with an alkyl isocyanate, preferably in the presence of an inert solvent. Suitable alkyl isocyanates include methyl isocyanate, butyl isocyanate, hexyl isocyanate, and like alkyl isocyanates. Suitable inert solvents are of the kind illustrated above for preparation of the phenyl carbonate ester.

Advantageously, reaction is carried out at temperatures of about 50° to 150° C., preferably about 80° to 110° C. The desired monoalkylcarbamate ester is readily recovered on evaporation of the reaction mixture, and purified if so desired.

The dialkylcarbamates of the invention (compounds of Formula I above in which both $R_1$ and $R_2$ are loweralkyl) can be prepared by heating (up to about 125° C.) a 1-phenethyl-4-piperidinol (Formula II above) with a dialkylcarbamic acid halide or anhydride, illustratively, the chloride or anhydride of dimethylcarbamic acid, dibutylcarbamic acid, and the like. Advantageously, the reaction is conducted in the presence of an inert solvent of the kind illustrated above, with or without an acid acceptor.

The acid addition salts of the free bases (Formula I above) and N-oxides thereof are obtained by reacting the free bases or N-oxides with pharmacologically acceptable acids, illustratively, hydrochloric, hydrobromic, sulfuric, phosphoric, sulfamic, acetic, lactic, tartaric, gluconic, citric, benzoic, salicylic, and like pharmacologically acceptable acids.

The N-oxides of this invention are prepared by reacting a free base having Formula I above with a peroxidizing agent such as hydrogen peroxide, perbenzoic acid, perphthalic acid, peracetic acid, benzoyl peroxide, persulfuric acid, permonosulfuric (Caro's) acid, and ozone. The reaction, advantageously, is carried out in an inert solvent, illustratively aqueous ethanol, ethanol, aqueous acetone, acetone, aqueous acetic acid, and glacial acetic acid. The reaction proceeds with satisfactory velocity at room temperature, although higher or lower temperatures, for example, from about 10° to 35° C., can be used. The nitrogen atom to which an oxygen atom is thus attached by oxidation is, of course, the nuclear nitrogen atom of the piperidine ring.

When used in therapy the novel compounds of the invention, in free base form or in the form of pharmacologically acceptable acid addition salts, can be combined with solid or liquid pharmaceutical carriers and formulated in the form of tablets, powder packets, or capsules, using starch and like excipients, or dissolved or suspended in suitable solvents or vehicles, for oral or parenteral administration.

The following examples are illustrative of the processes and products of the present invention, but are not to be construed as limiting.

PREPARATION 1

*Preparation of 1-Phenethyl-4-Piperidinol*

A solution consisting of 101.2 g. (1 mole) of 4-piperidinol and 127.0 g. (1.20 moles) of sodium carbonate dissolved in 600 ml. of water was heated to 60° C. in a 2-liter flask equipped with a thermometer, stirrer, dropping funnel, and condenser. During an interval of 3.5 hours, while maintaining the temperature of the reaction mixture between 50° and 60° C., a solution of 185.1 g. (1 mole) of phenethyl bromide in 500 ml. of ethanol was added. The reaction mixture was refluxed for 4 hours with stirring, and allowed to stand overnight at about 25° C. The mixture was then distilled (using a simple distilling head) until the head temperature reached 95° C., and then cooled to about 25° C. The mixture thus stripped of ethanol was then extracted with five 200-ml. portions of methylene chloride, and the combined methylene chloride extracts were washed with two 100-ml. portions of saturated sodium chloride solution. The washed methylene chloride solution was then dried overnight with 50 g. of anhydrous sodium sulfate. The solution was filtered, and concentrated to dryness under reduced pressure. The last traces of solvent were removed by heating the residue at about 95° C. at about 40 mm. mercury pressure for 20 minutes. The warm oily residue thus obtained was triturated with two 250-ml. portions of technical hexane (Skellysolve B). The crude product thus obtained was dissolved in 100 ml. of absolute ethanol and the solution was warmed to 35° C.; 200 ml. of USP ether was then added while swirling the solution gently. The ether-ethanol solution was cooled slowly and refrigerated at about −15° C. for 3 days, in order to induce substantially complete crystallization. The crystals were recovered on a filter, the filter cake was washed with 50 ml. of cold ether, and the crystals of 1-phenethyl-4-piperidinol were dried to constant weight in an oven at 50° C. under reduced pressure; dry weight, 124.2 g., melting point, 95.5–98.5° C.

Following the procedure described above but substituting for phenethyl bromide the following: p-chlorophenethyl bromide, p-ethylphenethyl bromide, and p-methoxyphenethyl bromide; 1-(p-chlorophenethyl)-4-piperidinol, 1-(p-ethylphenethyl)-4-piperidinol, and 1-(p-methoxyphenethyl)-4-piperidinol, respectively, were prepared.

EXAMPLE 1

*Preparation of 1-Phenethyl-4-Piperidyl Carbamate and the Hydrochloride Thereof*

PART A.—PREPARATION OF 1-PHENETHYL-4-PIPERIDYL PHENYL CARBONATE

A quantity, 4.1 g. (20 millimoles), of 1-phenethyl-4-piperidinol (Preparation 1) was dissolved in 25 ml. of dry pyridine and 15 ml. of toluene in a 100-milliliter flask equipped with dropping funnel, stirrer, and a calcium chloride drying tube. This solution was cooled in an ice-water bath while, during an internal of about one hour, a solution of 4.7 g. (30 millimoles) of phenyl chloroformate in 10 ml. of toluene was added. The reaction mixture was stirred for two hours at 0° to 5° C., removed from the ice bath, and stirring was continued overnight at about 25° C.

A solution of 1-phenethyl-4-piperidyl phenyl carbonate in pyridine and toluene was thus obtained.

PART B.—PREPARATION OF 1-PHENETHYL-4-PIPERIDYL CARBAMATE

A 1-liter, three-necked flask provided with a stopper, stirrer, and a gas exit tube fitted with a calcium chloride drying tube was cooled in an acetone-solid carbon dioxide bath for 10 minutes. After removing the calcium chloride drying tube from the gas exit tube, 300 ml. of liquid ammonia was introduced into the flask. The flask was then stoppered, but leaving the gas exit tube open. After standing a few minutes, the liquid ammonia was gently stirred for about five minutes to bring it to a temperature of about −70° C. The solution of 1-phenethyl-4-piperidyl phenyl carbonate obtained in Part A was then added to the ammonia in a thin stream, followed by a small amount of pyridine rinse, and the solution was then stirred at −70° C. for one hour. The cooling bath was removed and the ammonia was allowed to evaporate overnight without stirring. The residue thus obtained was mixed with 300 ml. of methylene chloride and the mixture was extracted with 50 ml. of ice-cold, 5% aqueous sodium hydroxide solution. The aqueous phase was separated and discarded. The organic phase was extracted with 50 ml. of ice-cold, 5% aqueous sodium hydroxide solution and the aqueous phase was separated and discarded. The organic phase was then washed with three 50-ml. portions of water and the washes were discarded. The solution was then evaporated to dryness under reduced pressure and the sticky residue that remained was triturated with 50 ml. of ether. The ether was decanted and the residue, after being air-dried, was a white solid weighing 3.8 g. This white solid was dissolved in 100 ml. of boiling absolute ethanol, the solution was filtered, and the filtrate was held overnight at about 25° C. The crystals of 1-phenethyl-4-piperidyl carbamate that formed were recovered on a filter, washed with 10 ml. of absolute ethanol, and dried to constant weight in an oven at 60° C. under reduced pressure. The yield was 3.0 g. (60.4% based on the 1-phenethyl- 4-piperidinol employed in Part A) and the crystals had a melting point of 189° to 191° C. An analytical sample prepared by recrystallization from absolute ethanol melted at 190° to 192° C.

*Analysis.*—Calculated for $C_{14}H_{20}N_2O_2$: C, 67.71; H, 8.12; N, 11.28. Found: C, 67.99, 68.24; H, 8.43, 8.34; N, 11.24, 11.44.

PART C.—PREPARATION OF 1-PHENETHYL-4-PIPERIDYL CARBAMATE HYDROCHLORIDE

Three grams (12.1 millimoles) of 1-phenethyl-4-piperidyl carbamate (Part B) was suspended in 15 ml. of water and concentrated hydrochloric acid was added, dropwise while shaking, until dissolution was completed. The solution was strongly acid at this point with pH of about 2. It was then slurried with 0.5 g. of decolorizing carbon (Darco G-60) and filtered through diatomite (Celite). The filtrate was evaporated to dryness under reduced pressure. The white solid thus obtained was dissolved in 15 ml. of boiling absolute ethanol and the solution was concentrated to about one-half its original volume. While the solution was still warm, 5 ml. of ether was added, and the solution was cooled and held at $-15°$ C. overnight. The resulting crystals of 1-phenethyl-4-piperidyl carbamate hydrochloride were separated, rinsed with 5 ml. of cold ethanol, and dried to constant weight at 50° C. under reduced pressure; weight, 2.5 g. The compound sintered at 252° C. and melted at 254° to 255° C. (decomp.).

*Analysis.*—Calculated for $C_{14}H_{21}ClN_2O_2$: Cl, 12.45; N, 9.84. Found: Cl, 12.85; N, 9.69.

Following the procedure as described above but substituting hydrobromic, sulfuric, phosphoric, sulfamic, acetic, lactic, tartaric, gluconic, citric, benzoic, and salicylic acid for hydrochloric acid, 1-phenethyl-4-piperidyl carbamate hydrobromide, sulfate, phosphate, sulfamate, acetate, lactate, tartrate, gluconate, citrate, benzoate, and salicylate respectively, were prepared.

EXAMPLE 2

*Preparation of 1-Phenethyl-4-Piperidyl Butylcarbamate and the Hydrochloride Thereof*

PART A.—PREPARATION OF 1-PHENETHYL-4-PIPERIDYL BUTYLCARBAMATE

A mixture consisting of 4.1 g. (20 millimoles) of 1-phenethyl-4-piperidinol, 5 ml. of butyl isocyanate, 10 ml. of pyridine, and 25 ml. of toluene was heated at 95° to 100° C. for four hours. The reaction mixture was then evaporated to dryness under reduced pressure at 95° to 100° C. and the residue was dissolved in 30 ml. of boiling methylene chloride. The methylene chloride solution was filtered, diluted with 50 ml. of acetone, and concentrated to about 40 ml. After standing overnight at about 25° C., one gram of white, crystalline 1-phenethyl-4-piperidyl butylcarbamate was recovered.

PART B.—PREPARATION OF 1-PHENETHYL-4-PIPERIDYL BUTYLCARBAMATE HYDROCHLORIDE

To a solution of 0.8 g. of 1-phenethyl-4-piperidyl butylcarbamate (Part A) in 10 ml. of absolute ethanol was added dropwise 1 ml. of concentrated hydrochloric acid. The clear colorless reaction mixture was diluted slowly with 20 ml. of ether and refrigerated at $-15°$ C. for three days. The white crystals that separated were recovered on a filter, washed with ether, and dried at 60° under reduced pressure, yielding 0.6 g. of 1-phenethyl-4-piperidyl butylcarbamate hydrochloride having a melting point of 219° to 220° C.

*Analysis.*—Calculated for $C_{18}H_{29}ClN_2O_2$: C, 63.42; H, 8.57; Cl, 10.40; N, 8.22. Found: C, 63.10; H, 8.43; Cl, 10.27; N, 8.56.

Following the procedure as described above but substituting hydrobromic, sulfuric, phosphoric, sulfamic, acetic, lactic, tartaric, gluconic, citric, benzoic, and salicyclic acid for hydrochloric acid, 1-phenethyl-4-piperidyl butylcarbamate hydrobromide, sulfate, phosphate, sulfamate, acetate, lactate, tartrate, gluconate, citrate, benzoate, and salicylate, respectively, were prepared.

EXAMPLE 3

*Preparation of 1-(p-Ethylphenethyl)-4-Piperidyl Carbamate*

PART A.—PREPARATION OF 1-(P-ETHYLPHENETHYL)-4-PIPERIDYL PHENYL CARBONATE

Following the procedure of Example 1, Part A, but substituting 1-(p-ethylphenethyl)-4-piperidinol for 1-phenethyl-4-piperidinol, a solution of 1-(p-ethylphenethyl)-4-piperidyl phenyl carbonate was obtained.

PART B.—PREPARATION OF 1-(P-ETHYLPHENETHYL)-4-PIPERIDYL CARBAMATE

Following the procedure of Example 1, Part B, but substituting 1-(p-ethylphenethyl)-4-piperidyl phenyl carbonate for 1-phenethyl-4-piperidyl phenyl carbonate, 1-(p-ethylphenethyl)-4-piperidyl carbamate was prepared.

EXAMPLE 4

*Preparation of 1-(p-Methoxyphenethyl)-4-Piperidyl Carbamate*

PART A.—PREPARATION OF 1-(P-METHOXYPHENETHYL)-4-PIPERIDYL PHENYL CARBONATE

Following the procedure of Example 1, Part A, but substituting 1-(p-methoxyphenethyl)-4-piperidinol for 1-phenethyl-4-piperidinol, a solution of 1-(p-methoxyphenethyl)-4-piperidyl phenyl carbonate was obtained.

PART B.—PREPARATION OF 1-(P-METHOXYPHENETHYL)-4-PIPERIDYL CARBAMATE

Following the procedure of Example 1, Part B, but substituting 1-(p-methoxyphenethyl)-4-piperidyl phenyl carbonate for 1-phenethyl-4-piperidyl phenyl carbonate, 1-(p-methoxyphenethyl)-4-piperidyl carbamate was prepared.

EXAMPLE 5

*Preparation of 1-(p-Chlorophenethyl)-4-Piperidyl Carbamate*

PART A.—PREPARATION OF 1-(P-CHLOROPHENETHYL)-4-PIPERIDYL PHENYL CARBONATE

Following the procedure of Example 1, Part A, but substituting 1-(p-chlorophenethyl)-4-piperidinol for 1-phenethyl-4-piperidinol, a solution of 1-(p-chlorophenethyl)-4-piperidyl phenyl carbonate was obtained.

PART B.—PREPARATION OF 1-(P-CHLOROPHENETHYL)-4-PIPERIDYL CARBAMATE

Following the procedure of Example 1, Part B, but substituting 1-(p-chlorophenethyl)-4-piperidyl phenyl carbonate for 1-phenethyl-4-piperidyl phenyl carbonate, 1-(p-chlorophenethyl)-4-piperidyl carbamate was prepared.

EXAMPLE 6

*Preparation of 1-Phenethyl-4-Piperidyl Methylcarbamate*

Following the procedure of Example 1, Part B, but substituting methylamine for ammonia, 1-phenethyl-4-piperidyl methylcarbamate was prepared.

EXAMPLE 7

*Preparation of 1-Phenethyl-4-Piperidyl Dimethylcarbamate*

A quantity, 4.1 g. (20 millimoles), of 1-phenethyl-4-piperidinol and 3.2 g. (30 millimoles) of dimethylcarbamoyl chloride was dissolved in pyridine and heated at 95° to 100° C. The reaction mixture was then evaporated to dryness under reduced pressure and the residue was dissolved in methylene chloride. The methylene chloride solution was washed with cold 5% aqueous sodium hydroxide solution, then with several portions of water, until the pH of the water wash was 7 to 8. The methylene chloride solution was dried with sodium sulfate, then concentrated to dryness under vacuum. The crude 1-phenethyl-4-piperidyl dimethylcarbamate was recrystallized from a mixture of acetone and petroleum ether (boiling range 40° to 60° C.).

EXAMPLE 8

*Preparation of 1-Phenethyl-4-Piperidyl Carbamate N-Oxide*

A solution of 2.53 g. (10.19 millimoles) of 1-phenethyl-4-piperidyl carbamate (prepared as in Example 1, Part B) and 20.2 millimoles of 30% hydrogen peroxide in 25 ml. of absolute ethanol was allowed to stand at room temperature for three days. To destroy excess peroxide, manganese dioxide was added to the solution until oxygen evolution ceased and the reaction mixture failed to color starch-potassium iodide paper. The mixture was filtered, and the filtrate was concentrated by evaporation under reduced pressure. The residue was dissolved in acetone and the solution was cooled at −20° C. The crystalline 1-phenethyl-4-piperidyl carbamate N-oxide was recovered on a filter and dried.

Following the procedure described above, but substituting 1-(p-ethylphenethyl)-4-piperidyl carbamate, 1-(p-methoxyphenethyl)-4-piperidyl carbamate, 1-(p-chlorophenethyl)-4-piperidyl carbamate, 1-phenethyl-4-piperidyl methylcarbamate, and 1-phenethyl-4-piperidyl dimethylcarbamate for 1-phenethyl-4-piperidyl carbamate, the corresponding N-oxides were prepared.

It will be understood that the free base compounds of Examples 3, 4, 5, 6, 7, and 8 can be neutralized according to the procedure of Example 1, Part C, with the appropriate acid to obtain the hydrochloride, hydrobromide, sulfate, phosphate, sulfamate, acetate, lactate, tartrate, gluconate, citrate, benzoate, and salicylate acid addition salts.

EXAMPLE 9

Ten thousand (10,000) tablets for oral use, each containing 10 mg. of 1-phenethyl-4-piperidyl carbamate hydrochloride, are prepared from the following types and amounts of materials:

| | Grams |
|---|---|
| 1-phenethyl-4-piperidyl carbamate hydrochloride | 100 |
| Starch U.S.P. | 170 |
| Talc U.S.P. | 130 |
| Lactose U.S.P. | 2600 |
| Sucrose powder U.S.P. | 37 |
| Calcium stearate | 19.5 |

The finely powdered lactose and sucrose are mixed well and the mixture is granulated with 10% starch paste. The wet mass is forced through an 8-mesh screen, dried at 120° F. in a forced-air oven, and then put through a 16-mesh screen. The remainder of the ingredients, in fine powder form, are mixed well and then mixed with the dried lactose granules. The final mixture is then compressed into tablets, which are administered at the rate of 1 to 2 tablets 2 to 4 times a day for the alleviation of symptoms caused by excessive gastric secretion.

I claim:

1. Compound selected from the group consisting of: (1) compounds represented by the following structural formula

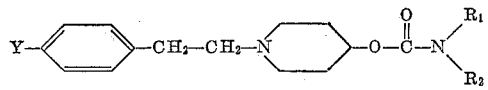

wherein Y is selected from the group consisting of hydrogen, halogen having an atomic weight between 35 and 127, lower-alkyl and lower-alkoxy, and wherein $R_1$ and $R_2$ are selected from the group consisting of hydrogen and lower alkyl, (2) N-oxides thereof, and (3) acid addition salts of said compounds and N-oxides thereof.

2. Pharmacologically acceptable acid addiiton salt of 1-phenethyl-4-piperidyl carbamate.
3. 1-phenethyl-4-piperidyl carbamate.
4. 1-phenethyl-4-piperidyl carbamate hydrochloride.
5. 1-phenethyl-4-piperidyl lower-alkylcarbamate.
6. 1-phenethyl-4-piperidyl butylcarbamate.
7. Pharmacologically acceptable acid addition salt of 1-phenethyl-4-piperidyl lower-alkylcarbamate.
8. 1-phenethyl-4-piperidyl butylcarbamate hydrochloride.

References Cited in the file of this patent

UNITED STATES PATENTS

| 2,746,965 | Biel | May 22, 1956 |
| 2,856,407 | Biel | Oct. 14, 1958 |
| 2,967,880 | Finke et al. | Jan. 10, 1961 |

OTHER REFERENCES

Biel et al.: "J. Am. Chem. Soc.," vol. 77, pp. 2250–2256 (1955).